(12) United States Patent
Ishikawa et al.

(10) Patent No.: US 7,992,885 B2
(45) Date of Patent: Aug. 9, 2011

(54) PILLION STEP DEVICE FOR MOTORCYCLE

(75) Inventors: Yuzuru Ishikawa, Saitama (JP); Kenji Morita, Saitama (JP)

(73) Assignee: Honda Motor Co., Ltd., Tokyo (JP)

( * ) Notice: Subject to any disclaimer, the term of this patent is extended or adjusted under 35 U.S.C. 154(b) by 273 days.

(21) Appl. No.: 12/056,067

(22) Filed: Mar. 26, 2008

(65) Prior Publication Data
US 2008/0238032 A1   Oct. 2, 2008

(30) Foreign Application Priority Data

Mar. 30, 2007 (JP) ................................. 2007-095622

(51) Int. Cl.
*B62J 25/00* (2006.01)
(52) U.S. Cl. ........... 280/291; 280/301; 74/564; 180/219
(58) Field of Classification Search .................... 74/527, 74/564, 594.7; 280/291, 301; 180/219
See application file for complete search history.

(56) References Cited

U.S. PATENT DOCUMENTS

| | | | | |
|---|---|---|---|---|
| 379,557 A | * | 3/1888 | Benfield | 280/291 |
| 518,698 A | * | 4/1894 | Pipes et al. | 280/301 |
| 4,267,744 A | * | 5/1981 | Yamasaki | 74/473.13 |
| 5,979,269 A | * | 11/1999 | Su-Chen | 74/564 |
| 6,068,075 A | * | 5/2000 | Saiki | 180/219 |
| 6,648,357 B2 | * | 11/2003 | Hotch | 280/301 |
| 7,111,375 B2 | * | 9/2006 | Buckhouse et al. | 29/428 |
| 7,114,739 B2 | * | 10/2006 | Colano | 280/291 |
| 7,243,750 B2 | * | 7/2007 | Nakabayashi et al. | 180/68.1 |
| 2003/0071438 A1 | * | 4/2003 | Burkett | 280/291 |
| 2007/0057484 A1 | * | 3/2007 | Gilman | 280/291 |
| 2007/0062327 A1 | * | 3/2007 | Kouchi et al. | 74/564 |
| 2008/0111345 A1 | * | 5/2008 | Springer | 280/291 |

FOREIGN PATENT DOCUMENTS

| | | |
|---|---|---|
| DE | 195 11 760 A1 | 10/1996 |
| JP | 64-1672 A | 1/1989 |
| JP | 5-208691 A | 8/1993 |
| JP | 2002-284067 A | 10/2002 |
| JP | 2003-154982 A | 5/2003 |

* cited by examiner

*Primary Examiner* — Anne Marie M Boehler
*Assistant Examiner* — Maurice Williams
(74) *Attorney, Agent, or Firm* — Birch, Stewart, Kolasch & Birch, LLP

(57) ABSTRACT

To operate a pillion step in one action. The pillion step is formed in a generally L shape and includes an arm portion and a foot rest portion. One end of the arm portion is pivotably secured through an oblique pivot shaft to a side face of a seat rail located under a rider seat and is pivotally moved around the oblique pivot shaft. When the pillion step is to be retracted and is pivotally moved backward, the foot rest portion moves into a gap between the rider seat and a pillion seat and its tip end is received within a grip space formed in a grip.

4 Claims, 6 Drawing Sheets

PILLION STEP DEVICE FOR MOTORCYCLE

CROSS-REFERENCE TO RELATED APPLICATIONS

This nonprovisional application claims priority under 35 U.S.C. §119(a) on Patent Application No. 2007-095622, filed in Japan on Mar. 30, 2007, the entirety of which is incorporated herein by reference.

BACKGROUND OF THE INVENTION

1. Field of the Invention

The present invention relates to a pillion step device for a motorcycle. More particularly, the present invention relates to a pillion step device for a motorcycle that can be stowed in one action.

2. Background of the Invention

A pillion step device is known, wherein a pillion step is pivotable between a use position and a retracted position and is stowed inside a vehicle body cover (see JP-A No. S64-1672).

SUMMARY OF THE INVENTION

According to the pillion step of the background art, which is stowed inside a vehicle body cover, it is required to first fold up a foot rest portion, and then move an arm portion pivotally and retract it inside the vehicle body cover. Thus, two actions are required. If these two operations can be reduced to one operation, an advantage will be gained. Therefore, it has been desired to make a one-action operation possible. It is an object of the present invention to achieve such a demand.

For achieving the above-mentioned object, according to a first aspect of the present invention, there is provided a pillion step device for a motorcycle in which a pillion step is secured to a vehicle body frame so as to be pivotable between a use position and a retracted position, the vehicle body frame supporting a rider seat and a pillion seat in a front-and-rear relation, wherein the pillion step comprises an integral combination of an arm portion and a foot rest portion, one end of the arm portion being secured pivotably to the vehicle body frame in front of the pillion seat, and the foot rest portion being retracted to a position under the pillion seat when the pillion step is retracted to the retracted position.

According to a second aspect of the present invention, a grip is provided in the vehicle body frame at a position under the pillion seat and the foot rest portion is retracted into a gripping recess of the grip.

According to a third aspect of the present invention, a rear cover that covers at least the portion under the seats is provided in a rear portion of the vehicle body frame, the rear cover having a recess for receiving therein the pillion step.

According to the first aspect of the present invention, there is provided a pillion step comprising an integral combination of an arm portion and a foot rest portion and, when the pillion step is to be stowed, the foot rest portion can be retracted to the position under the pillion seat by merely moving the whole pivotally without folding up the foot rest portion. Thus, the pillion step can be stowed in one action, whereby convenience is improved. When the pillion step is not in use, the foot rest portion can be retracted to the position under the pillion seat, whereby appearance is also improved.

According to the second aspect of the present invention, a grip is provided under the pillion seat and the foot rest portion is received in a grip part space of the grip. Therefore, the grip not in use can be utilized effectively as a receptacle portion and the foot rest portion can be received therein positively.

According to the third aspect of the present invention, a pillion step receiving recess is formed in the rear cover that covers at least the portion under the seats. Therefore, the pillion step when stowed can be retracted into the recess of the rear cover. Thus, the rear cover can be utilized effectively and can permit the pillion step to be stowed therein. In addition, since the pillion step does not project outwards during travel of the motorcycle, it is possible to decrease the running resistance.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention, and wherein.

DETAILED DESCRIPTION OF THE PREFERRED EMBODIMENTS

Figure 1:
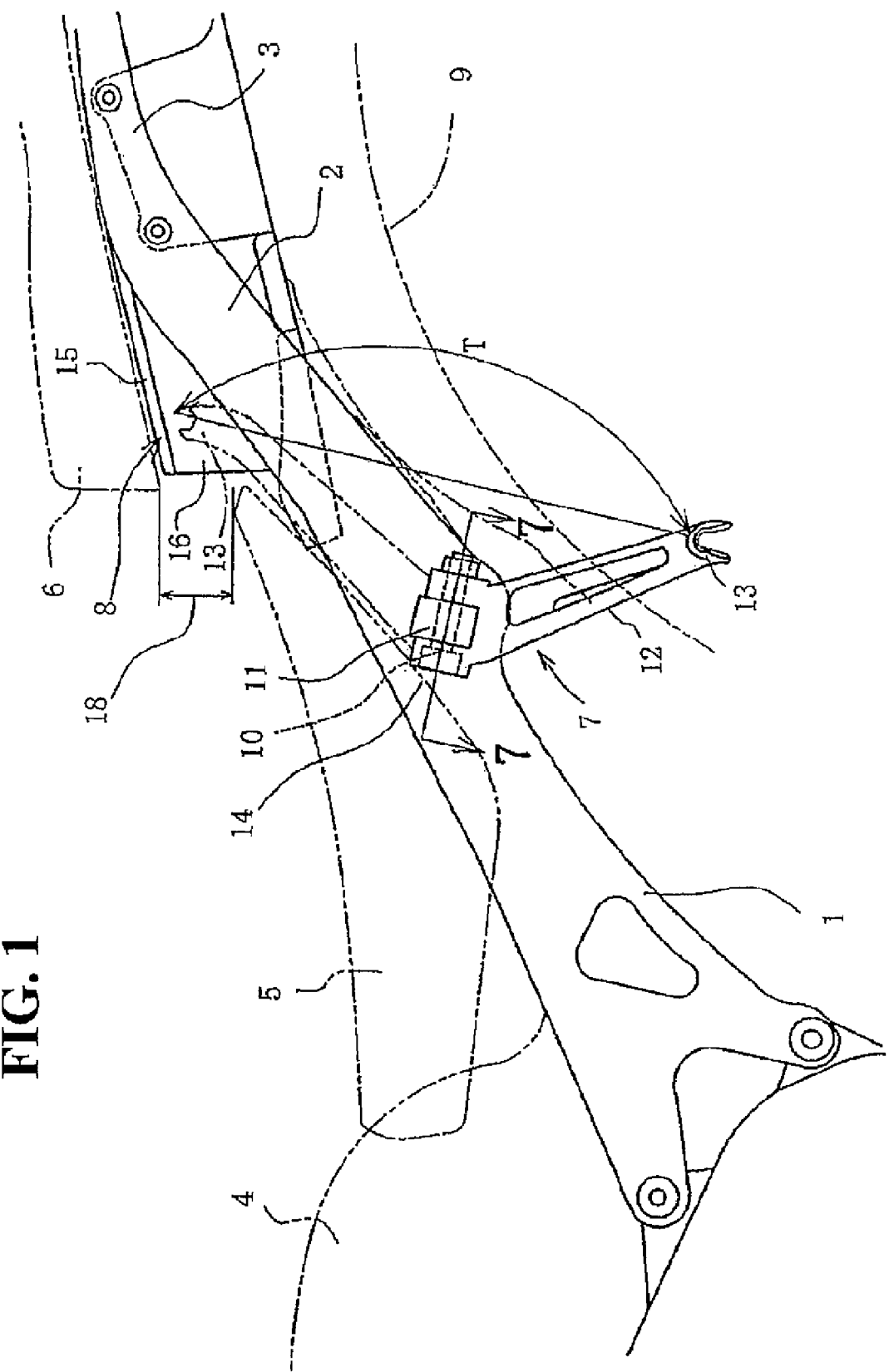
FIG. 1 is a side view of a rear portion of a body of a motorcycle.

The present invention will now be described in detail with reference to the accompanying drawings, wherein the same reference numerals will be used to identify the same or similar elements throughout the several views. It should be noted that the drawings should be viewed in the direction of orientation of the reference numerals.

FIG. 1 is a side view showing principal components in a rear portion of a body of a motorcycle. A seat rail 1 extending in the longitudinal direction is bent obliquely upward at an intermediate portion thereof to form a stepped portion 2, thereby affording a raised rear portion 3. A rear end portion of a fuel tank 4 and a rider seat 5 are supported on a front portion of the seat rail 1. A pillion seat 6 is supported on a rear portion of the seat rail 1.

Under the rider seat 5, one end of a pillion step 7 is secured pivotably to a side face of the seat rail 1. Under a lower end of the pillion seat 6, a grip 8 is supported on the stepped portion 2. A rear wheel 9 is positioned under the pillion seat 6.

One end of the pillion step 7 is secured pivotably to a mounting lug 11 through a pivot shaft 10, which is inclined forward and obliquely upward, the mounting lug 11 being attached to a side face of the seat rail 1. The pillion step 7 has an arm portion 12 and a foot rest portion 13. The arm portion 12 is provided at one end thereof with a bifurcated boss portion 14 that is mounted on the pivot shaft 10 with the mounting lug 11 positioned between the bifurcated portions.

The pillion step 7 is pivotable within a plane perpendicular to the pivot shaft 10. However, since the arm portion 12 is oblique with respect to the pivot shaft 10, the foot rest portion 13 describes a sectorial locus T in side view. As to the pillion step 7, its solid-line position in the figure is a use position, while its phantom-line position is a retracted position. When the pillion step is stowed, the foot rest portion 13 moves into a gap between the rider seat 5 and the pillion seat 6 and a tip end portion thereof is accommodated in a grip space 16 formed in a lower portion of the grip 8.

Figure 2:
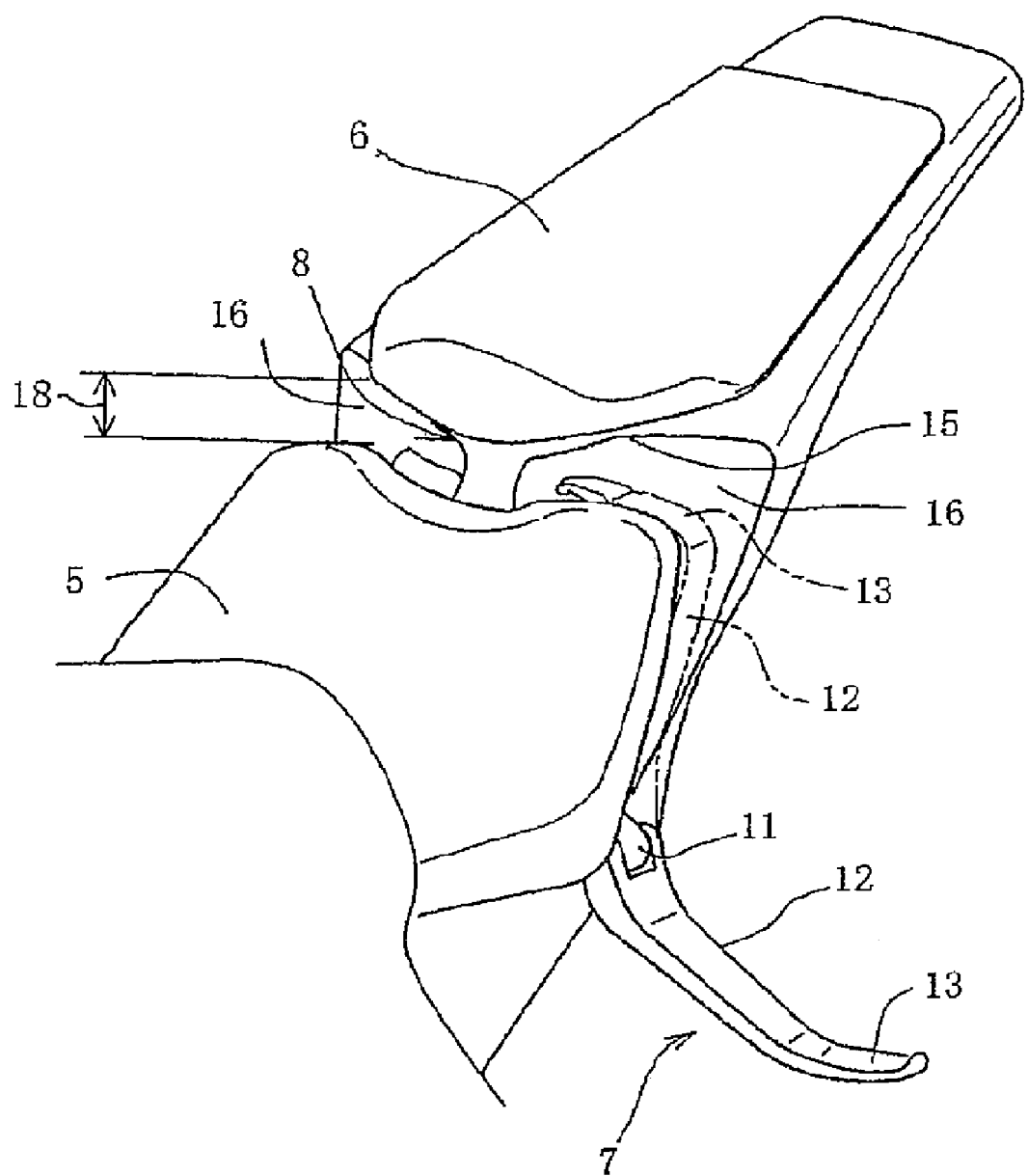
FIG. 2 is a perspective view showing seats and a pillion step.

FIG. 2 is a perspective view showing a layout state of the rider seat 5 and the pillion seat 6. A rear end portion of the rider seat 5 is formed as a stepped portion 18, which is lower than a front-end upper portion of the grip 8 and which faces the grip space 16 formed in the lower portion of the grip 8. The grip space 16 is formed under the pillion seat 6 and is open sideways and forward behind the rider seat 5 so as to permit a tip end part of the foot rest portion 13 to be received therein.

Figure 3:
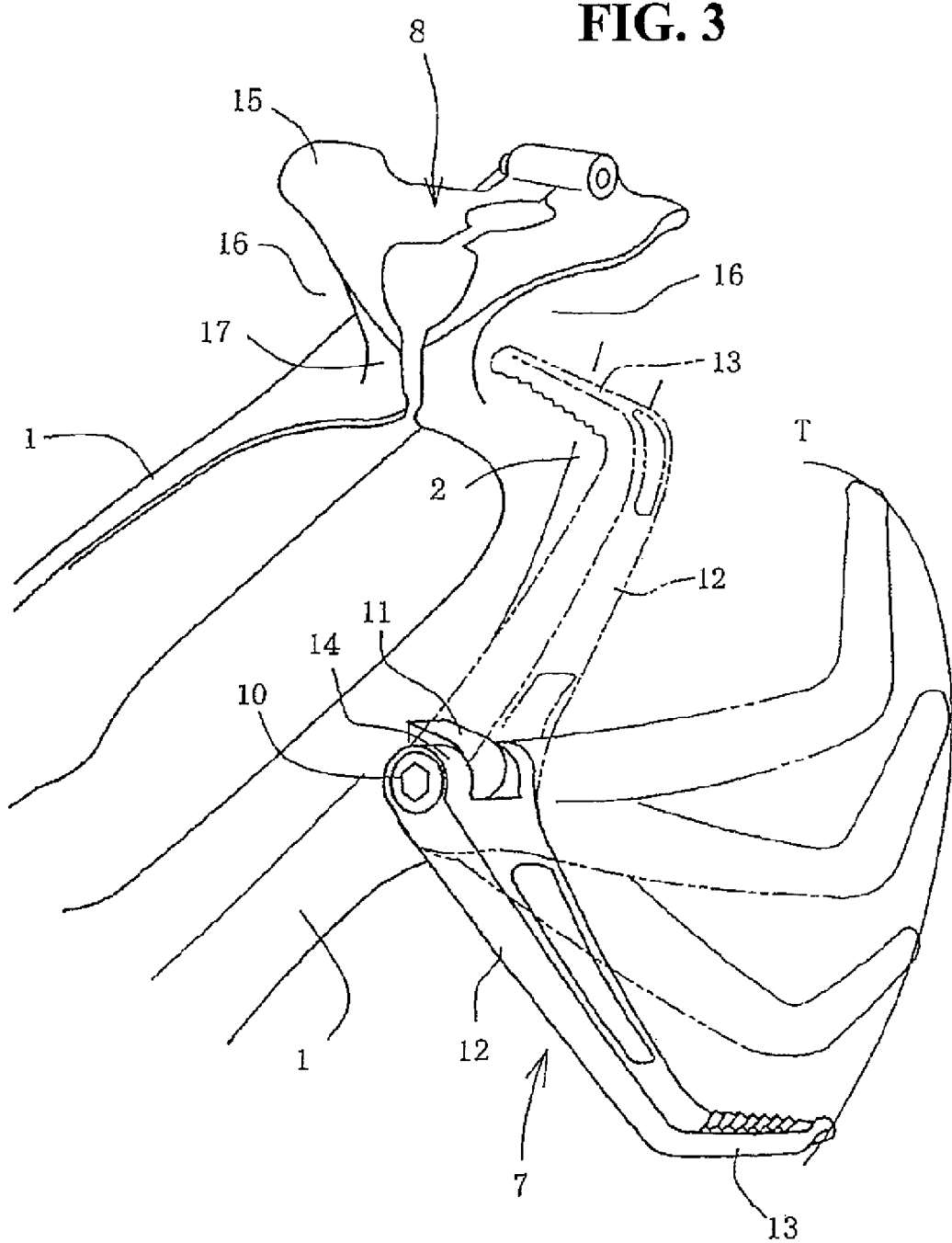
FIG. 3 is a perspective view showing a mounted state of the pillion step to the vehicle body.

FIG. 3 is a perspective view of the seat rail 1. The pillion step 7 is secured to the mounting lug 11 that is formed to project from the left side face of the seat rail 1. When the pillion step 7 is to be stowed, the tip end part of the foot rest portion 13 moves into the grip space 16 while crossing the space above the stepped portion 2.

The grip 8 is a member which is generally T-shaped in front view. An upper portion of the grip 8 is formed as a grip portion 15 projecting in the transverse direction, a central portion thereof is formed as a leg portion 17 extending in the vertical direction, and at a lower end of the leg portion 17 the grip 8 is secured to an upper surface of the stepped portion 2.

Under the grip portion 15 and sideways of the leg portion 17, the grip space 16 is formed. The grip portion 15 is for the fellow passenger to grip and is triangular on the right-hand side in plan view. A front edge of the grip portion 15 is a slant whose outer side is retracted to ensure a large spacing from the rear end portion of the rider seat 5, thereby making easy access to the grip space 16 and ensuring an opening for entering and leaving of the tip end of the foot rest portion 13.

Figure 4:
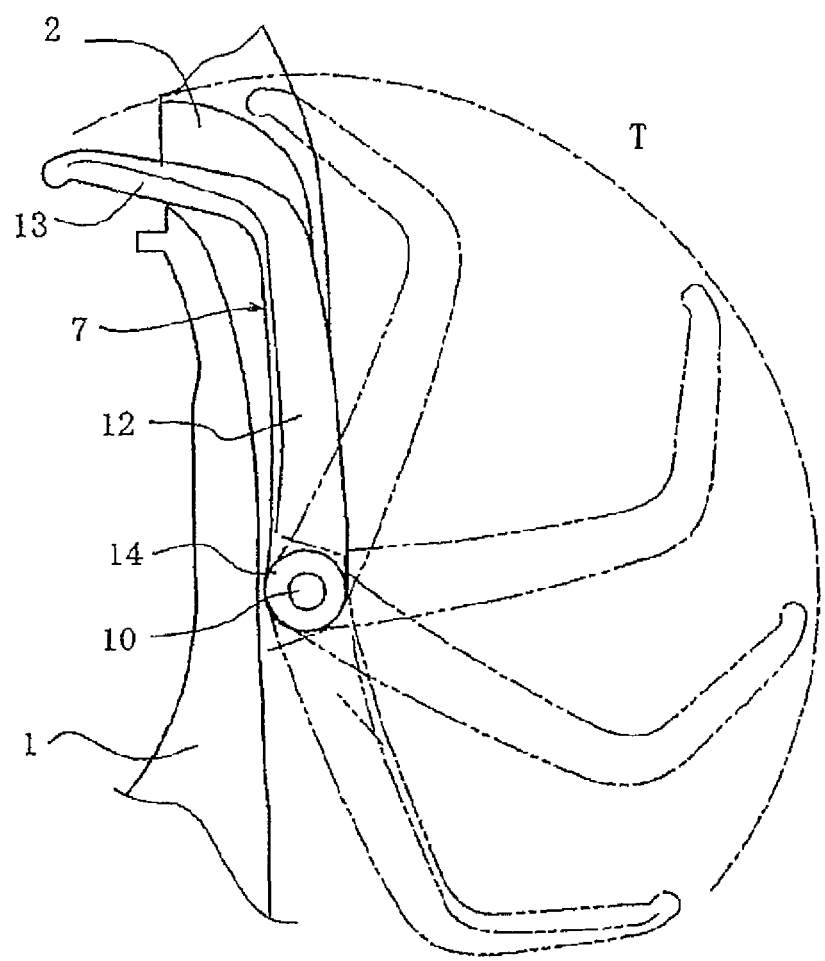
FIG. 4 is a diagram showing a pivoting motion of the pillion step.

FIG. 4 is a view showing the pillion step 7 as seen in the direction of the pivot shaft 10, which is substantially the front side. The pillion step 7 as a whole is generally L-shaped and the arm portion 12 and the foot rest portion 13 are formed continuously and integrally. The foot rest portion 13 moves along the locus T centered on the pivot shaft 10, so that the direction of the foot rest portion 13 in its retracted position and that in its use portion are reverse to each other. Even if the foot rest portion 13 projects sideways outwards nearly perpendicularly in the use position, in the retracted position, the foot rest portion 13 faces sideways inwards nearly perpendicularly and crosses the space above the stepped portion 2.

The actual pivot shaft 10 is inclined obliquely so as to fairly lie down in the horizontal direction, so that the foot rest portion 13 moves in the vertical direction and thus the height thereof in the retracted position and that in the use position are different vertically. In the use position the foot rest portion 13 is positioned below the seat rail 1 so that the fellow passenger can put his or her foot thereon.

Figure 5:
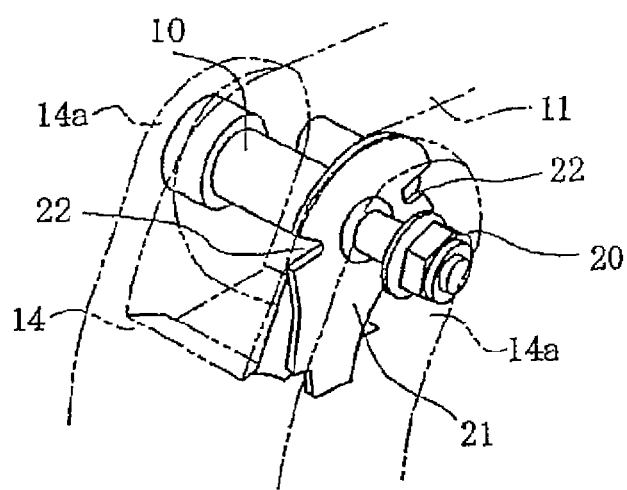
FIG. 5 is a side view of a boss portion.
Figure 6:
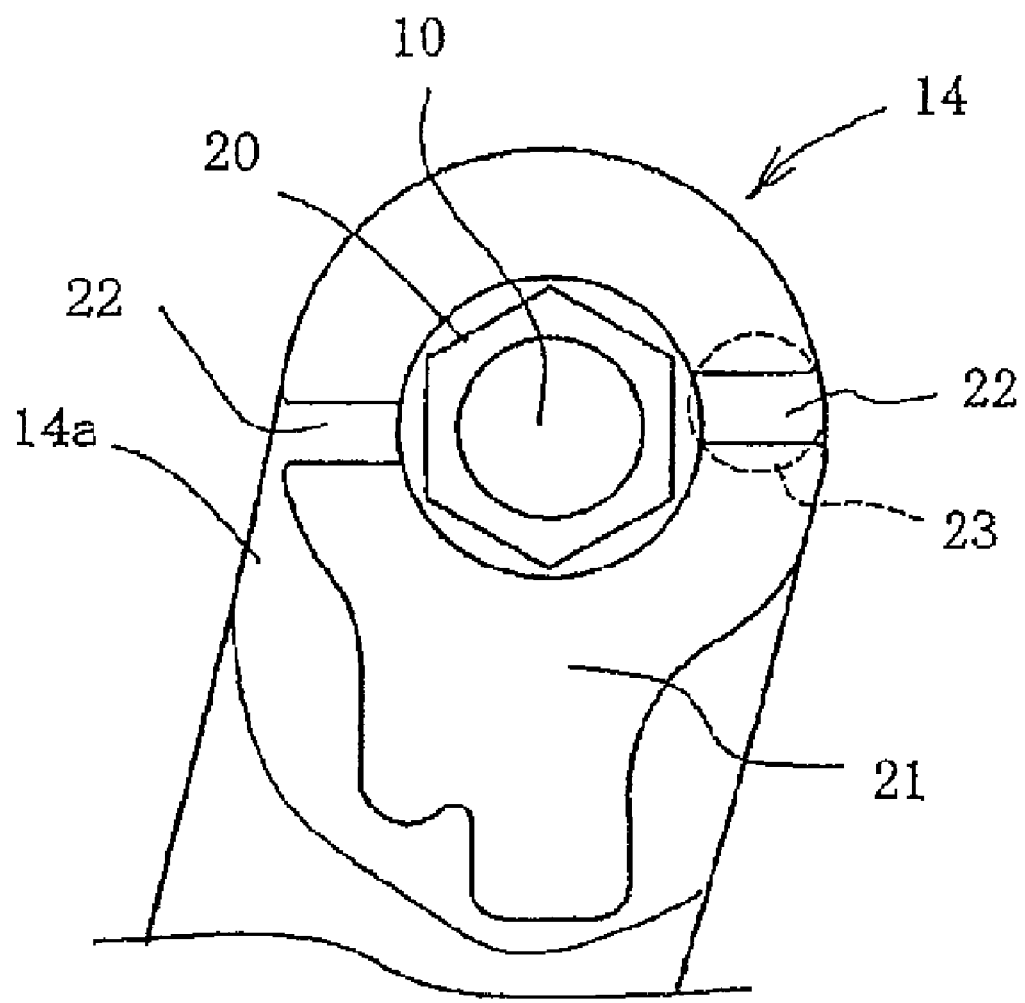
FIG. 6 is a perspective view showing a pivot inhibiting mechanical portion.

FIG. 5 is a side view of the boss portion 14 and FIG. 6 is an enlarged perspective view showing a pivot inhibiting structure portion for the boss portion 14. As shown in these figures, a nut 20 is clamped to one end of the pivot shaft 10, which is in the shape of a bolt. A locking plate 21 adapted to pivot around the pivot shaft 10 is integral with the boss portion 14.

The locking plate 21 is formed with locking grooves 22 in opposite positions on both sides of the pivot shaft 10. Upon pivoting of the locking plate 21 to the use position or the retracted position, a locking ball 23 (see FIG. 6), which is provided beforehand on the mounting lug 11 side, comes into engagement with one locking groove 22 to inhibit the pivotal movement.

Figure 7:
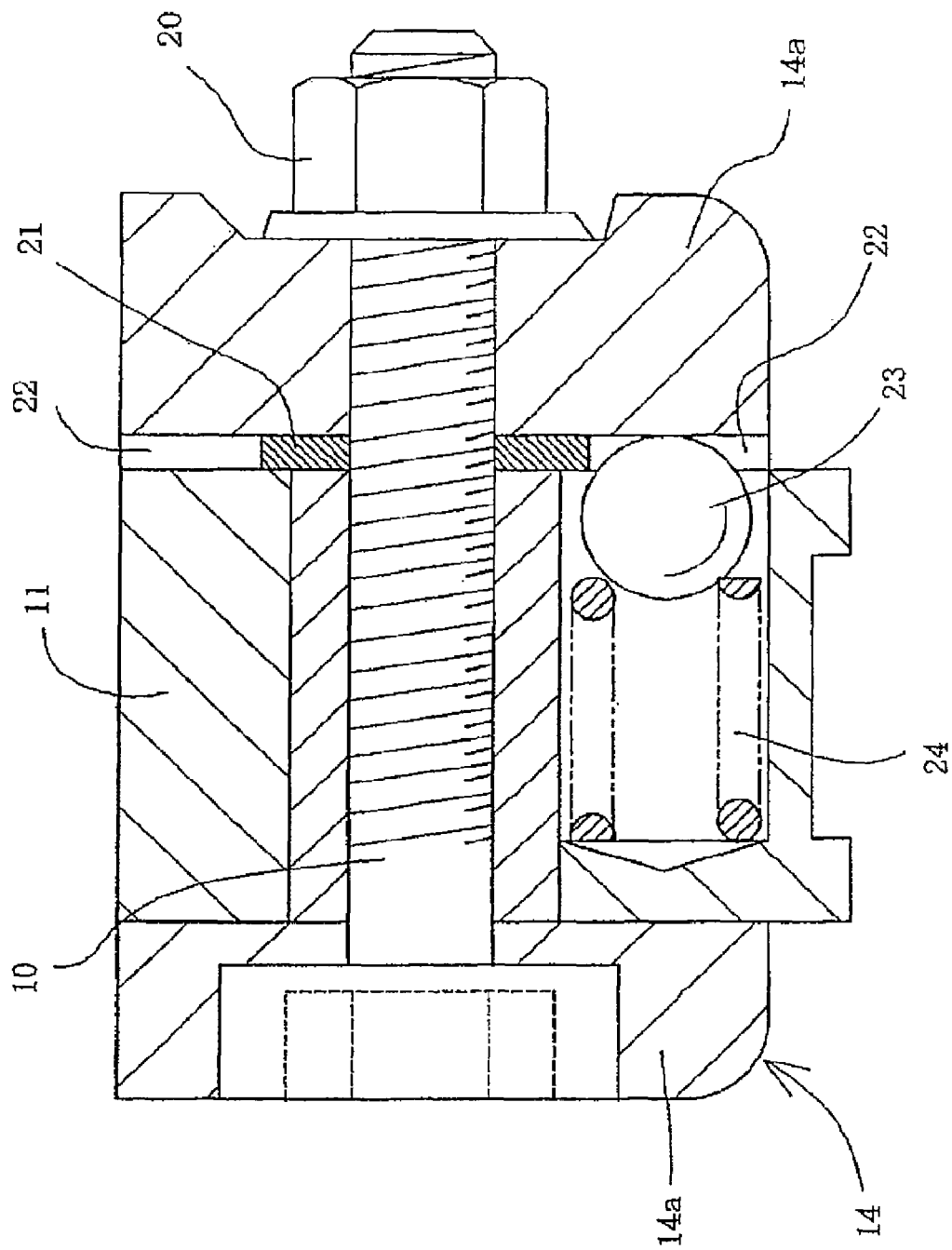
FIG. 7 is a sectional view taken on line 7-7 in FIG. 1.

FIG. 7 is a sectional view taken on line 7-7 in FIG. 1. In the boss portion 14 provided at one end of the arm portion 12, the mounting lug 11 is fitted in between a pair of opposed mounting arms 14a and is connected thereto through the pivot shaft 10. The pivot shaft 10 is, for example, a socket bolt and one end thereof is fixed with the nut 20. The locking plate 21 is provided in the boss portion 14 so as to pivot integrally with the boss portion. The locking grooves 22 are formed in part of the locking plate 21 and the locking ball 23, which is provided on the mounting lug 11 side, comes into engagement with one locking groove 22, whereby the locking plate 21 is locked at its pivotal position.

The locking ball 23 is urged projectingly in its locking direction by a spring mechanism 24, e.g., a coil spring, and when a locking groove 22 moves onto the locking ball 23, the locking ball projects into the locking groove 22 to effect locking. The locking grooves 22 are formed in 180°-spaced symmetric positions so as to correspond to the retracted position and the use position. The spacing between the locking grooves 22 may be set freely in accordance with the pivotal angle of the pillion step 7. If the locking plate 21 is made separate from the boss portion 14, the production thereof becomes easier, but it also may be formed directly on an end face of the boss portion 14.

The operation of this embodiment will now be described. As shown in FIGS. 2 to 4, in the use position, the foot rest portion 13 projects sideways outward nearly perpendicularly, permitting the fellow passenger to put his or her foot thereon. When the pillion step 7 is to be retracted in this state, force acting in the retracting direction is applied to the pillion step 7, causing the pillion step to move pivotally. As a result, the locking ball 23 is pushed out from the locking groove 22 against the urging force of the spring mechanism 24 and is thus unlocked, whereby the foot rest portion 13 becomes pivotable along the locus T. Consequently, the foot rest portion 13 moves within an oblique rotation circle centered on the pivot shaft 10 and first spreads sideways of the vehicle body, then gradually approaches the seat rail 1. Eventually, the foot rest portion 13 crosses the space above the stepped portion 2 while facing inwards perpendicularly, moves into the gap between the rear end of the rider seat 5 and the front end of the pillion seat 6, and a tip end portion thereof is received within the grip space 16 (FIG. 2). Thereafter, at the appropriate pivotal position, the locking ball 23 again engages into a locking groove 22 to lock the locking plate.

For movement from the retracted position to the use position, operations reverse to the above may be performed.

The retracting operation is a mere application of force to the pillion step 7, causing the pillion step to move pivotally. Thus, the pillion step can be stowed in one action without the need of folding up the foot rest portion 13, which is required in the background art. Therefore, it becomes possible to perform a quick operation and the convenience is improved. In addition, when the pillion step 7 is not used, that is, when there is no fellow passenger, the grip 8 is utilized effectively and the foot rest portion 13 can be received therein.

Moreover, since the foot rest portion 13 of the pillion step 7 is stowed positively between the rear end of the rider seat 5 and the pillion 6, the appearance is also improved.

The present invention is not limited to the above embodiment, but various modifications and applications may be made within the principles of the present invention. For example, in case of providing a rear cover which covers at least a side portion of the vehicle body under the rider seat, etc., if a recess capable of receiving therein the arm portion of the pillion step when retracted is formed in the rear cover, the arm portion when retracted is received within the recess and does not project from the surface of the rear cover, whereby it is possible to maintain a smooth flow uniforming surface of the rear cover and hence possible to decrease the running resistance.

In addition, the pillion step can be stowed by utilizing the rear cover effectively, and the appearance is improved.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A pillion step device for a motorcycle, comprising:
a pillion step secured to a vehicle body frame so as to be pivotable between a use position and a retracted position, the vehicle body frame supporting a rider seat and a pillion seat in a front-and-rear relation,
wherein the pillion step comprises an integral combination of an arm portion and a foot rest portion, one end of the arm portion is secured pivotably to the vehicle body frame in front of the pillion seat, and the foot rest portion is retracted to a position under the pillion seat when the pillion step is retracted to the retracted position,
wherein a grip is provided in the vehicle body frame at a position under the pillion seat and the foot rest portion is retractable into a gripping recess of the grip, and
wherein the foot rest portion is located above the rider seat when the pillion step is retracted to the retracted position.

2. A pillion step device for a motorcycle, comprising:
a pillion step secured to a vehicle body frame so as to be pivotable between a use position and a retracted position, the vehicle body frame supporting a rider seat and a pillion seat in a front-and-rear relation,
wherein the pillion step comprises an integral combination of an arm portion and a foot rest portion, one end of the arm portion is secured pivotably to the vehicle body frame in front of the pillion seat, and the foot rest portion is retracted to a position under the pillion seat when the pillion step is retracted to the retracted position,
wherein a rear cover that covers at least the portion under the seats is provided in a rear portion of the vehicle body frame, the rear cover having a recess for receiving the pillion step therein, and
wherein the foot rest portion is located above the rider seat when the pillion step is retracted to the retracted position.

3. A pillion step device for a motorcycle, comprising:
a pillion step, said pillion step including an arm portion and a foot rest portion, one end of the arm portion being pivotably secured to a vehicle body frame of the motorcycle by a pivot shaft so as to be pivotable between a use position and a retracted position, said pillion step being formed from a single, one-piece member including the arm portion and the foot rest portion,
wherein foot rest portion is retractable to the retracted position by pivoting the end of the arm portion about the pivot shaft,
wherein a grip is provided in the vehicle body frame at a position under a pillion seat of the motorcycle, and the foot rest portion is retractable into a gripping recess of the grip, and
wherein the foot rest portion is located above the rider seat when the pillion step is retracted to the retracted position.

4. A pillion step device for a motorcycle, comprising:
a pillion step, said pillion step including an arm portion and a foot rest portion, one end of the arm portion being pivotably secured to a vehicle body frame of the motorcycle by a pivot shaft so as to be pivotable between a use position and a retracted position, said pillion step being formed from a single, one-piece member including the arm portion and the foot rest portion,
wherein foot rest portion is retractable to the retracted position by pivoting the end of the arm portion about the pivot shaft,
wherein a rear cover that covers at least the portion under the seats of the motorcycle is provided in a rear portion of the vehicle body frame, the rear cover having a recess for receiving the pillion step therein, and
wherein the foot rest portion is located above the rider seat when the pillion step is retracted to the retracted position.

* * * * *